3,503,899
CATALYTICALLY ACTIVE COMPOSITION AND PROCESS UTILIZING THE SAME

William L. Hergenrother, Akron, Ohio, assignor to The Firestone Tire & Rubber Company, Akron, Ohio, a corporation of Ohio
No Drawing. Filed Feb. 13, 1967, Ser. No. 615,392
Int. Cl. B01j 11/32, 11/82; C08g 17/003
U.S. Cl. 252—430      7 Claims

ABSTRACT OF THE DISCLOSURE

This invention relates to a catalytically active composition, including a poly-amine terminated compound, e.g. an amine-ended poly(epsilon-caprolactam), and a catalytically active metallic compound, for example antimony trioxide or zinc acetate. The invention also relates to a polymerization process which utilizes a unique coaction discovered to exist between these agents to yield higher molecular weight polyester polymers and polyester polymers having better heat stability. The catalytically active composition is particularly useful in the production of poly(ethylene terephthalate) having a molecular weight above about 16,000 and having an improved heat stability.

---

The prior art is replete with examples of linear polyesters and processes for producing such polyesters. For the most part, linear polyesters are based upon phthalic acid, isophthalic acid, terephthalic acid, succinic acid, or sebacic acids. The esters are formed by reaction of such dibasic acids with a dihydric alcohol such as ethylene glycol, propylene glycol, or the like. Many metallic catalysts have been utilized in the preparation of these materials which are commercially important in view of their ability to be drawn into fibers. Thus, Patent 2,518,283 teaches the production of poly(ethylene terephthalate) utilizing zinc borate as a catalyst. Patent 2,534,028 teaches the use of litharge as a catalyst to produce this polyester. Patent 2,558,547 teaches the use of an alkali metal hydride. Germanium and germanium oxide are catalytic materials in Patent 2,578,660. Cobaltous acetate, alone or in combination with litharge or antimony trioxide, are utilized as catalytic materials in Patent 2,641,592. The utilization of antimony trioxide as a catalytic material is taught in Patent 2,647,885. Various organometallic titanium compounds are disclosed as catalytic materials in Patent 2,720,502. Various organometallic zirconium compounds, various organometallic aluminum compounds, and various organometallic tin compounds are disclosed as catalytic materials in Patents 2,720,504; 2,720,506; and 2,720,507. Basic ferric acetate is disclosed as a catalytic material in Patent 2,740,768. Zinc, manganese, and cadmium salts of aliphatic dibasic acids are taught in Patent 2,580,483. Stannous formate is disclosed in Patent 2,892,815 as a catalytic material for producing polyesters such as polyethylene terephthalate. Zinc acetate is disclosed in Patent 2,951,827. Zinc diethyl dithiocarbamate is disclosed in Patent 2,956,985 as a catalytic material. Magnesium hypophosphite is disclosed in Patent 2,974,122 as a catalytic material. Stannous phosphide is disclosed in Patent 2,979,483. Antimony trifluoride is disclosed as a catalyst in Patent 2,998,412. Zinc acetate in combination with various metallic compounds, such as metal fluotitanates, or in combination with arsenic pentoxide or trioxide, is disclosed in Patent 3,068,204; and Patent 3,068,205, respectively. Various germanium compounds are disclosed as catalytic materials in Patent 3,074,913. Many other examples of metal-containing polyester catalysts, including free metals, may be found in the prior art. All are useful as components of the present invention.

The principal difficulty with the foregoing metallic catalytically active materials is that the high concentrations of metal which are necessary in order to effect polymerization of the esters (that is, amounts above 0.008 weight percent based on the weight of the ester) lead to degradation or insufficient molecular weight development, and instability of the resulting polymer to heat. It is to the solution of the problems with respect to molecular weight development and/or heat stability that the present invention is particularly directed.

It has been found that an improved high molecular weight polyester, having improved stability to heat, may be obtained by condensing an ester, or a pre-polymer composition therefor, in the presence of a catalytic amount of a catalytic composition comprising (A) from about 1 to 250 parts by weight, preferably about 50 parts by weight, of an amine-terminated compound having the general formula $NH_2$—R—$NH_2$, wherein R is a bivalent organic radical, containing from about 6 to about 100 carbon atoms or more, having a molecular weight of from about 100 to about 1500, and a capability of withstanding condensation temperatures of from about 200° C. to about 350° C.; and (B) from about 1.0 to 8 parts by weight, preferably about 5 parts by weight, of a metal-containing polyester catalyst. The catalytic amount of the foregoing catalytic composition utilized in the condensation is that which is sufficient to provide from about 0.001 to about 0.250 weight percent, preferably about 0.05 weight percent of (A), and from about 0.001 to about 0.008 weight percent, preferably about 0.005 weight percent of (B) based on the weight of polymerizable ester, or pre-polymer.

As indicated above, R comprises a bivalent organic radical. It has been determined that the nature of the organic radical R, is of little or no consequence so long as the molecular weight is within the aforesaid molecular weight range, and so long as the resultant amine-ended material is stable at condensation temperatures. The functional groups in this material appear to be, therefore, the terminal amine groups. Best results have been secured, however, where the organic radical contains nitrogen as part of an amine group which is either primary, secondary, or tertiary. R can be polymeric or monomeric, aromatic, cycloaliphatic, or aliphatic, or various combinations thereof. Examples of radicals, of which the bivalent organic radical R may be composed therefore, include alkylene radicals such as hexamethylene, dodecamethylene, hexadecamethylene, etc.; aryl radicals such as phenylene, naphthylene, diphenylene, phenylmethylene; alkaryl radicals such as tolylene, dimethyl phenylene, ethyl phenylene; aralkyl radicals such as 2-phenyl ethylene and 3-phenyl propylene; and cycloalkylene radicals such as cyclohexylene. These hydrocarbon radicals may also contain substituent groups such as halogen, nitro, alkoxy; e.g. methoxy, epoxy, carbonyl, etc.

As indicated, the nature of the organic moiety of the amine-terminated component is of little consequence in respect of the utility of the broad class of compounds. It is necessary only that the organic amine-terminated component be heat stable under the conditions of the polymerization, be unreactive with the metallic component, and be unreactive, except in a catalytic sense, with the polymerizable materials. Materials from which the amine-ended catalytic agent may be produced include 2,7-naphthalene dicarboxylic acid, poly(p,p'-isopropylidene diphenyl isophthalate), poly(hexamethylene adiphate), polyethylene sebacate, 4-(beta-hydroxyethoxy)-3-methyl benzoic acid, and the like. In general, any organic material which is difunctional with respect to a material capable of attaching at least one primary amine group at the point of functionality on the organic material, may be used to form the amine-ended components hereof. Correspondingly, any primary amine providing substance, e.g. alkylene diamine, such as ethylene diamine, may be used to react with the foregoing difunctional organic material to yield the amine-ended component.

The amine constituent of the catalytic material may be supplied by any reactive amino compound, such as ethylene diamine, ammonia, or the like, and may be primary, secondary, or tertiary. This material combines with the precursor of the catalytic material to form an amine-terminated complex. Examples of amines useful in the present invention include hydrazine, ethylene diamine, diethylene triamine, triethylene tetramine, and tetraethylene pentamine; the preferred example of which is ethylene diamine.

A preferred example of the amine-terminated component of the catalysts of the present invention is formed by reacting ethylene diamine with a poly(epsilon-caprolactam) in a mole ratio such that one mole of ethylene diamine is provided for from 2 to 10 moles of the caprolactam polymer units. Examples of the preferred catalytic materials will be given subsequently.

The metallic component of the catalyst composition of the present invention may consist of any of the metallic compounds previously mentioned, and those which are commonly used as polyester catalysts.

As indicated above, the catalyst components may be added to the polymerization mass, either separately or in combined form, or they may be added simultaneously or in a two-step process.

The preparation of the polyesters involves the interaction of well-known polyester components, for example a dicarboxylic acid, or a low molecular weight alcohol diester thereof, with a dihydric or polyhydric alcohol. Although polyesters have been prepared by the use of free carboxylic acid with the polyhydric alcohol, it is advantageous to prepare the long chain polyesters by a series of ester interchange reactions wherein low molecular weight alcohol esters of the dicarboxylic acid are employed, and the result is the formation of the polyester and a by-product low molecular weight alcohol. For example, the reaction of ethylene glycol with dimethylterephthalate displaces the relatively low boiling methyl alcohol component of the ester and forms the poly(ethylene terephthalate) polyester. Usually, in the preparation of these polyesters, displacement of the low molecular weight monohydric alcohol occurs in one stage, which alcohol, when removed from the polymerization mass, leaves a residue which is identified as a pre-polymer. By further heating the pre-polymer, in the presence of the catalytic materials of the present invention, there is obtained the desired high molecular weight polyester having an improved stability to elevated temperatures. This reaction proceeds with the splitting out of glycol to form the high molecular weight polyester.

In the preparation of the pre-polymers and polymers, there may be used esters of terephthalic acid, isophthalic acid, phthalic acid, with a mono- or polyhydric alcohol of from 1 to 6 carbon atoms, such as methyl alcohol, ethyl alcohol, propyl alcohol, tertiary butyl alcohol, isohexyl alcohol, ethylene glycol, propylene glycol, tetramethylene glycol, and hexamethylene glycol. The ester of the carboxylic acid and alcohol may be diester, such as disclosed in U.S. Patent No. 2,727,881. These esters may be converted into fiber-forming polyester products by a process such as described in German Patent No. 818,117.

The fibers produced from certain of the polymers, resulting from the practice of this invention, may be employed in the knitting or weaving of fabrics of all types, such as cloth and seat covers, as well as in the production of non-woven, felt-like products produced by well-known conventional methods.

As indicated above, poly(ethylene terephthalate) is the preferred polyester. Other polyesters include those described above as well as those specifically described in U.S. Patent Nos. 3,057,826, 3,057,908, and 3,062,786.

In preparing such polyesters, it is advantageous to conduct the polymerization in an inert atmosphere, with substantially anhydrous components, at an elevated temperature which is increased during the course of the condensation up to a temperature of from about 225° C. to 310° C. The final stages of the polymerization are advantageously carried out under high vacuum. The detailed conditions of polymerization can be varied in order to meet the demands of the physical properties sought, and these conditions are well documented in the prior art. Significant examples of such art have been referred to above.

It is to be noted that the catalyst composition of the present invention is not limited to the catalysis of any particular polyester, or any particular polymerization process for producing polyesters. The polyesters as prepared by the method of this invention are of the linear type and have a molecular weight that is above 16,000, or above an intrinsic viscosity of about 0.6 measured in a 0.5% solution of the polyester in a 1:1 phenol-tetrachloroethane solvent at 25° C.

It becomes convenient, at this point, to further illustrate the invention by giving specific examples which are to be understood as illustrative of the invention, but not limiting the invention to the precise scope of such examples. Those skilled in the art will be able, by applying the principles illustrated in these examples, to carry out the invention with other specific materials.

An amine-terminated poly(epsilon-caprolactam) is readily prepared by reacting a predetermined number of moles of caprolactam, e.g. from 2 to 10, with one mole of ethylene diamine at a temperature of from 250° C. to 260° C. in a closed container, for a period of from 10 to 20 hours. The resultant polymer may be washed and dried, and then ground in a Wiley mill, and then used directly as the catalyst material.

EXAMPLE A

An amine-terminated poly(epsilon-caprolactam) was prepared by reacting three moles of caprolactam and one mole of ethylene diamine for a period of 16 hours at 256° C., in a closed container. The resultant polymer was washed, dried, and ground in a Wiley mill. This product is useful as a catalytic material, as will be shown in the annexed Table I.

The total polymer yield was approximately 90%. This compound is what is identified as a D.P.-3 material, this being an indication of the degree of polymerization. This product is a relatively low molecular weight, approximately 400, material, and is useful as a catalytic agent. Other catalytic agents of a similar type may be prepared by reacting under the same conditions five moles of caprolactam, with one mole of ethylene diamine; and 10 moles of caprolactam with ethylene diamine. Such reactions then produce catalytic agents identified as D.P.-5 diamine-terminated poly(epsilon-caprolactam) and D.P.-10 diamine-terminated poly(epsilon-caprolactam). The D.P.-5 material has a molecular weight of approximately 625, and the D.P.-10 material has a molecular weight of approximately 1200.

The annexed Table I illustrates the treatment of various pre-polymers with various catalytic systems, showing the effect of the catalytic systems, not only on molecular weight, but, also upon the heat stability characteristics as measured by heat aging at 300° C.

EXAMPLE B

An amine-terminated poly(epsilon-caprolactam) was prepared by reacting five moles of caprolactam and one mole of ethylene diamine in a flask, with stirring, for a period of 16 hours, at a temperature of 260° C. in a closed container. The resultant polymer was washed, dried, and ground in a Wiley mill. This polymer may be used directly as one of the components of the catalyst composition of this invention.

EXAMPLE C

An amine-terminated poly(epsilon-caprolactam) was prepared by reacting ten moles of caprolactam and one mole of ethylene diamine for a period of 16 hours at a temperature of 256° C. in a closed container. The resultant polymer was washed, dried, and ground in a Wiley mill. This product may be used directly as one of the components of a catalyst composition in accordance with this invention.

In the annexed Table I, reference is had to a pre-polymer for poly(ethylene terephthalate). A typical procedure for preparing such a pre-polymer is as follows:

EXAMPLE D

To a Hobart mixer equipped with a stainless steel bowl were added 1992 grams of terephthalic acid, 1116 grams of ethylene glycol, and 1.0 gram of calcium acetate monohydrate. The mixture was beaten for a period of 15 minutes at high speed, and charged to a one gallon, stainless steel autoclave equipped with electrically-controlled heating means and with the fractionating column removed. After purging the system with lamp grade nitrogen, 5 times, the reactor was sealed and heated to a temperature of 240° C. Heating to this temperature required a period of two hours, and the reaction vessel pressure was allowed to build to 140 p.s.i.g. At this point, the pressure was slowly vented down to 100 p.s.i.g. by bleeding off the water produced in the esterification reaction. Water was vented at this pressure for a period of two hours, and thereafter the pressure was slowly lowered to 24 p.s.i.g. during the next hour. Thereafter a total of 500 cc. of liquid was collected, having a density of 1.023, which is equivalent to 15% ethylene glycol. This represents a total of 425 grams (98%) of water, with a loss of only 84 grams of ethylene glycol (1.35 moles). The product was removed through the bottom drop valve in the autoclave as a clear liquid which, upon cooling, gave a brittle white pre-polymer weighing 2511 grams. This product was found to have a molecular weight in the range from 800 to 1000.

In the annexed Table I, the procedure for producing the polyesters has been substantially constant for the particular examples illustrated. Accordingly, the following example may be regarded as typical for the production of polyesters in accordance with the present invention. When condensation is initiated, as evidenced by the evolution of water or alcohol or glycol as the case may be, the polymerization reaction is basically a time-temperature reaction.

EXAMPLE E

To produce a poly(ethylene terephthalate) having a reduced carboxyl content, there were added to a 200 ml. round bottom flask equipped with a nitrogen inlet, stirrer, and water condenser, 100 grams of low molecular weight poly(ethylene terephthalate) prepolymer produced in accordance with Example D above; 0.05 gram of low molecular weight amine-terminated poly(epsilon-caprolactam), as prepared in Example A above; and to 0.0050 gram of antimony trioxide. These ingredients were heated with stirring to a temperature of 285° C. in a metal bath, and when the ethylene glycol formed in the course of the reactions ceased to distill over, the pressure in the system was gradually reduced to 0.15 mm. of mercury, and the reaction continued for an additional three hours at 275° C., under a pressure of 0.15 mm. of Hg.

Upon cooling, a tan polymer was obtained which had the following properties: melting point, 254° C.–256° C.; relative viscosity, 1.44; intrinsic viscosity, 0.78; molecular weight, 22,000. This product was found by titration to have 0.026 milliequivalent of COOH/gram, which represents 0.58 carboxyl groups per polymer chain.

Referring now to Table I, it will be observed that, when the pre-polymer of Example D is treated with a conventional metallic catalyst antimony trioxide, without the amine-terminated catalyst of the present invention, there is obtained a relatively low molecular weight product in which the heat stability, as measured by the slope, is in the upper end of the desired range. Example 2 shows that, with the amine-terminated catalyst of the present invention, and in the absence of any metallic catalyst, the molecular weight development of the product is not satisfactory. However, when, as shown in Examples 3 and 4, the amine-terminated catalyst of the present invention is used in conjunction with the antimony trioxide catalyst, the molecular weight development is exceptionally good.

Example 5 shows that a regular nylon [poly(epsilon-caprolactam)] in combination with antimony trioxide as the catalytic agent, shows very poor development of molecular weight.

Example 6 shows that antimony trioxide, when used in the very low concentrations which may be used in this invention and in the absence of any amine-terminated component, the molecular weight development is again quite low.

Examples 7 and 8 show the use of the combination of an amine-terminated nylon and zinc acetate as the catalytic composition wherein both of these products develop molecular weights within the desired range.

Examples 9 through 11 utilize Example A as the amine-terminated catalytic component in three different concentrations with the antimony trioxide at a low level and illustrating the development of very high molecular weights. The heat stability is exceptionally good as illustrated by the relatively low slope, for Examples 9 and 10. However, it will be noted with Example 11, that the slope is relatively quite high, and this is indicative of the fact that too much of the amine-ended catalytic agent was employed.

Examples 12 through 14 utilize an amine-terminated nylon catalyst in the same concentrations as for Examples 9 through 11, and again show the development of good molecular weight, and in Examples 12 and 13 exceptionally good heat stability. However, when one approaches the higher concentration of the amine-ended nylon, the heat stability falls off, although the molecular weight is exceptionally good.

Examples 15 and 16 show the utilization of an amine-terminated catalyst prepared in accordance with Example C and utilized in the two preferred concentrations. Here, again, the molecular weight development is very good and, in the lower concentration of the amine-ended nylon catalyst component, the heat stability is exceptionally good. With the higher concentration, the heat stability is approaching the upper limit of satisfactory heat stability.

TABLE I.—PRODUCTION OF POLY(ETHYLENE TEREPHTHALATE)

| Ex. No. | Amine Treated Catalyst - Starting material | Weight of starting material | Identity | (Ex. No.) | Metallic Catalyst - Wt. gms. | Identity | Wt. gms. | Time hrs. | Max. temp. °C. | Final pressure, mm. Hg. | Avg. melting point, °C. | Relative viscosity | Intrinsic viscosity | Molecular weight | Heat Aging at 300° C. 15 min. gm./min. | 30 min. gm./min. | 45 min. gm./min. | 60 min. gm./min. | Slope hr.⁻¹ |
|---|---|---|---|---|---|---|---|---|---|---|---|---|---|---|---|---|---|---|---|
| 1 | Pre-polymer | 100 | None | | | Sb₂O₃ | 0.025 | 4.75 | 280 | 0.15 | 259 | 1.40 | 0.71 | 19,800 | 4.71 | 8.76 | 17.22 | 28.50 | 1.06 |
| 2 | do | 100 | Amine ended nylon | (A) | 0.5 | None | | 4.25 | 285 | 0.15 | 255 | 1.24 | 0.45 | 11,900 | | | | | |
| 3 | do | 100 | do | (A) | 0.5 | Sb₂O₃ | 0.005 | 4.25 | 285 | 0.11 | 255 | 1.42 | 0.75 | 21,000 | | | | | |
| 4 | do | 100 | do | (A) | 0.05 | Sb₂O₃ | 0.005 | 4.00 | 285 | 0.15 | 255 | 1.44 | 0.78 | 22,000 | | | | | |
| 5 | do | 100 | Regular nylon | | 2.0 | Sb₂O₃ | 0.005 | 3.00 | 285 | 0.15 | | 1.23 | 0.43 | 11,400 | | | | | |
| 6 | do | 100 | None | | | Sb₂O₃ | 0.005 | 3.00 | 285 | 0.15 | | 1.33 | 0.60 | 16,500 | | | | | |
| 7 | do | 100 | Amine ended nylon | (A) | 0.05 | Sb₂O₃ | 0.012 | 3.00 | 285 | 0.08 | | 1.36 | 0.65 | 18,000 | | | | | |
| 8 | Pre-polymer (Zinc acetate dihydrate) | 100 | do | (A) | 0.05 | (¹) | (²) | 3.0 | 285 | 0.10 | 249 | 1.39 | 0.70 | 19,600 | | | | | |
| 9 | Pre-polymer (Ca acetate monohydrate) | 100 | do | (A) | 0.005 | Sb₂O₃ | 0.005 | 3.0 | 285 | 0.05 | | 1.42 | 0.75 | 21,000 | 4.74 | 7.26 | 11.76 | 19.26 | 0.77 |
| 10 | do | 100 | do | (A) | 0.050 | Sb₂O₃ | 0.005 | 3.0 | 285 | 0.05 | | 1.47 | 0.82 | 24,000 | 3.50 | 5.72 | 9.58 | 14.80 | 0.86 |
| 11 | do | 100 | do | (A) | 0.500 | Sb₂O₃ | 0.005 | 3.0 | 285 | 0.05 | | 1.47 | 0.82 | 24,000 | 3.21 | 7.32 | 18.48 | 41.40 | 1.51 |
| 12 | do | 100 | do | (B) | 0.005 | Sb₂O₃ | 0.005 | 3.00 | 285 | 0.05 | | 1.37 | 0.66 | 18,500 | 8.82 | 13.56 | 18.96 | 28.80 | 1.69 |
| 13 | do | 100 | do | (B) | 0.500 | Sb₂O₃ | 0.005 | 3.00 | 285 | 0.05 | | 1.40 | 0.71 | 19,800 | 6.42 | 11.04 | 20.08 | 34.20 | 0.97 |
| 14 | do | 100 | do | (B) | 0.005 | Sb₂O₃ | 0.005 | 3.00 | 285 | 0.05 | | 1.43 | 0.75 | 21,000 | 6.64 | 14.84 | 33.54 | 54.48 | 1.41 |
| 15 | do | 100 | do | (C) | 0.050 | Sb₂O₃ | 0.005 | 3.00 | 285 | 0.05 | | 1.41 | 0.72 | 20,000 | 6.62 | 9.50 | 14.72 | 21.60 | 1.69 |
| 16 | do | 100 | do | (C) | 0.050 | Sb₂O₃ | 0.005 | 3.00 | 285 | 0.15 | | 1.42 | 0.75 | 21,000 | 1.62 | 3.50 | 6.90 | 13.16 | 1.22 |
| 17 | do | 100 | {1,3-di(N-2-aminopropyl-4-piperidyl)propane} | | | Sb₂O₃ | 0.005 | 3.00 | 285 | 0.05 | | 1.48 | 0.83 | 24,500 | 3.16 | 6.28 | 13.96 | 26.16 | 1.19 |
| 18 | do | 100 | do | | | Sb₂O₃ | 0.050 | 3.00 | 285 | 0.05 | | 1.43 | 0.75 | 21,000 | 5.88 | 11.36 | 21.76 | 42.12 | 1.14 |
| 19 | do | 100 | {1,3-di(1,p-aminophenyl-4-piperidyl)propane} | | | Sb₂O₃ | 0.005 | 3.00 | 285 | 0.05 | | 1.48 | 0.83 | 24,500 | 3.54 | 6.54 | 12.06 | 22.92 | 1.08 |
| 20 | do | 100 | 1,3-di-4-piperidyl propane | | | Sb₂O₃ | 0.005 | 3.00 | 285 | 0.05 | | 1.46 | 0.79 | 23,000 | 4.48 | 7.38 | 14.14 | 22.11 | 0.93 |

¹ Zinc acetate.
² Retained.

Examples 17 through 20 show the use of different amine-ended organic catalytic components and illustrate the development of exceptionally good molecular weights, and heat stabilities at the upper end of the desired range. Heat stabilities, as measured by the slope which are in the range of from 0.5 to 1.5, are satisfactory for the purposes of this invention. The preferred slopes are those which are less than 1. The molecular weight should be above 1600, and preferably from 18,000 to 24,000.

To make the determinations for the heat aging, there has been employed a Mullowney Viscometer, which is run in the following manner: A 30 gram sample of ground poly(ethylene terephthalate) is dried at 80° C. overnight in a rotary drier, under a pressure of 0.01 mm. of Hg before being loaded into the heated chamber of the viscometer. The sample is allowed to stand for 15 minutes at 300° C. before the chamber is pressurized with 500 p.s.i.g. of lamp grade nitrogen and then, the flow rate in grams per minute, through a 0.043 inch x 0.843 inch die is measured. The pressure is then released, and at 30, 45, and 60 minutes, the above procedure is repeated. The logarithm of the flow rate for each sample is then plotted against time, yielding a straight line, the slope of which represents the first order decomposition rate of the polymer. Thus, Table I contains slopes as determined by the foregoing method. The flatter the slope, the better the stability of the product upon long term exposure to elevated temperatures.

What is claimed is:

1. A catalyst composition useful for the preparation of high molecular weight polyesters characterized by improved stability to heat and comprising (A) from about 1.0 to 250 parts by weight of an amine-terminated poly(caprolactam), having a molecular weight of from 100 to 1500 and capable of withstanding condensation temperatures of from about 250° C. to 350° C., 1,3-di(N-γ-aminopropyl-4-piperidyl) propane, 1,3-di(1,p-aminophenyl-4-piperidyl) propane, or 1,3-di(4-piperidyl) propane, and (B) from about 1.0 to 8 parts by weight of antimony trioxide or zinc acetate.

2. The catalytic composition of claim 1 wherein (A) is present in an amount of about 50 parts by weight, and (B) is present in an amount of about 5 parts by weight.

3. The catalytic composition of claim 1 wherein the degree of polymerization of the poly(caprolactam) is from 2 to 10.

4. A catalyst composition useful for the preparation of high molecular weight polyesters characterized by improved stability to heat and comprising in combination (A) from about 1 to about 250 parts by weight of an amine-terminated poly(caprolactam) prepared by reacting 1 mole of an alkylene diamine with from 2 to 10 moles of caprolactam at a temperature of from 250° C. to 260° C. for a period of 10 to 20 hours, and (B) from about 1.0 to about 8 parts by weight of antimony trioxide or zinc acetate.

5. The catalytic composition of claim 1 wherein the alkylene diamine is ethylene diamine.

6. The catalytic composition of claim 1 wherein the metal-containing catalyst is antimony trioxide.

7. The catalytic composition of claim 1 wherein the alkylene diamine is ethylene diamine, the number of lactam units is 3 and the metal-containing catalyst is antimony trioxide.

References Cited

UNITED STATES PATENTS 2,647,885  8/1953  Billica _____ 260—75
2,951,827  9/1960  Siggel _____ 260—75

PATRICK P. GARVIN, Primary Examiner

U.S. Cl. X.R.

252—431; 260—75

PO-1050
(5/69)

UNITED STATES PATENT OFFICE
CERTIFICATE OF CORRECTION

Patent No. 3,503,899  Dated  March 31, 1970

Inventor(s)  William L. Hergenrother

It is certified that error appears in the above-identified patent and that said Letters Patent are hereby corrected as shown below:

Col. 7, Table I, Ex.No. 8, under "identity (second occurrence)

should read --do-- instead of blank space

Signed and sealed this 11th day of January 1972.

(SEAL)
Attest:

EDWARD M. FLETCHER, JR.　　　ROBERT GOTTSCHALK
Attesting Officer　　　　　　　Acting Commissioner of Patents